No. 791,943. PATENTED JUNE 6, 1905.
J. H. PROSSER.
EDUCATIONAL APPLIANCE.
APPLICATION FILED JUNE 22, 1904.
2 SHEETS—SHEET 1.
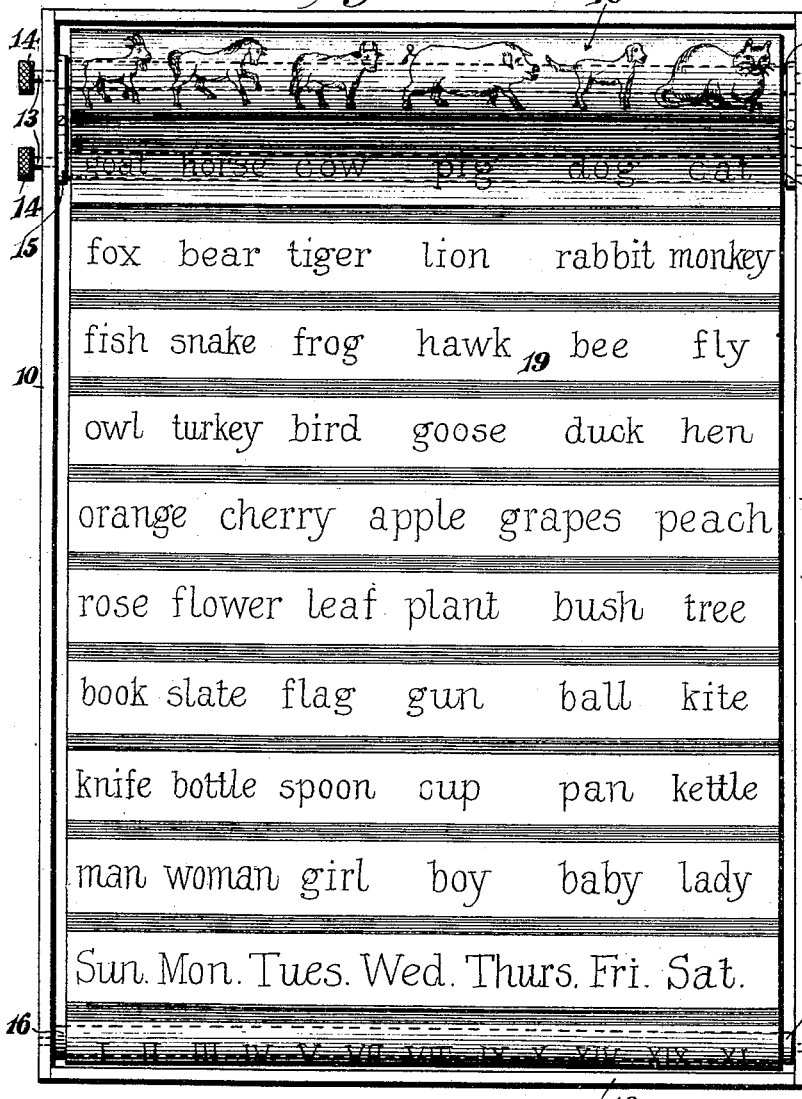
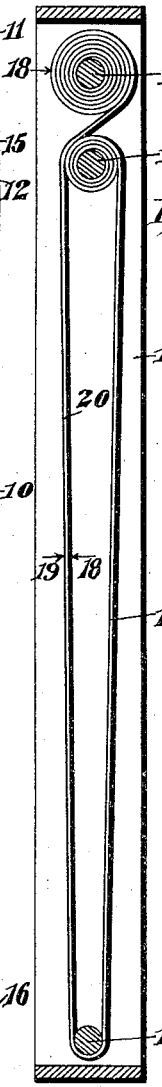
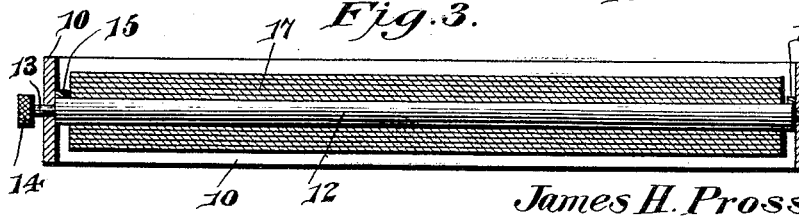
James H. Prosser, Inventor
Witnesses

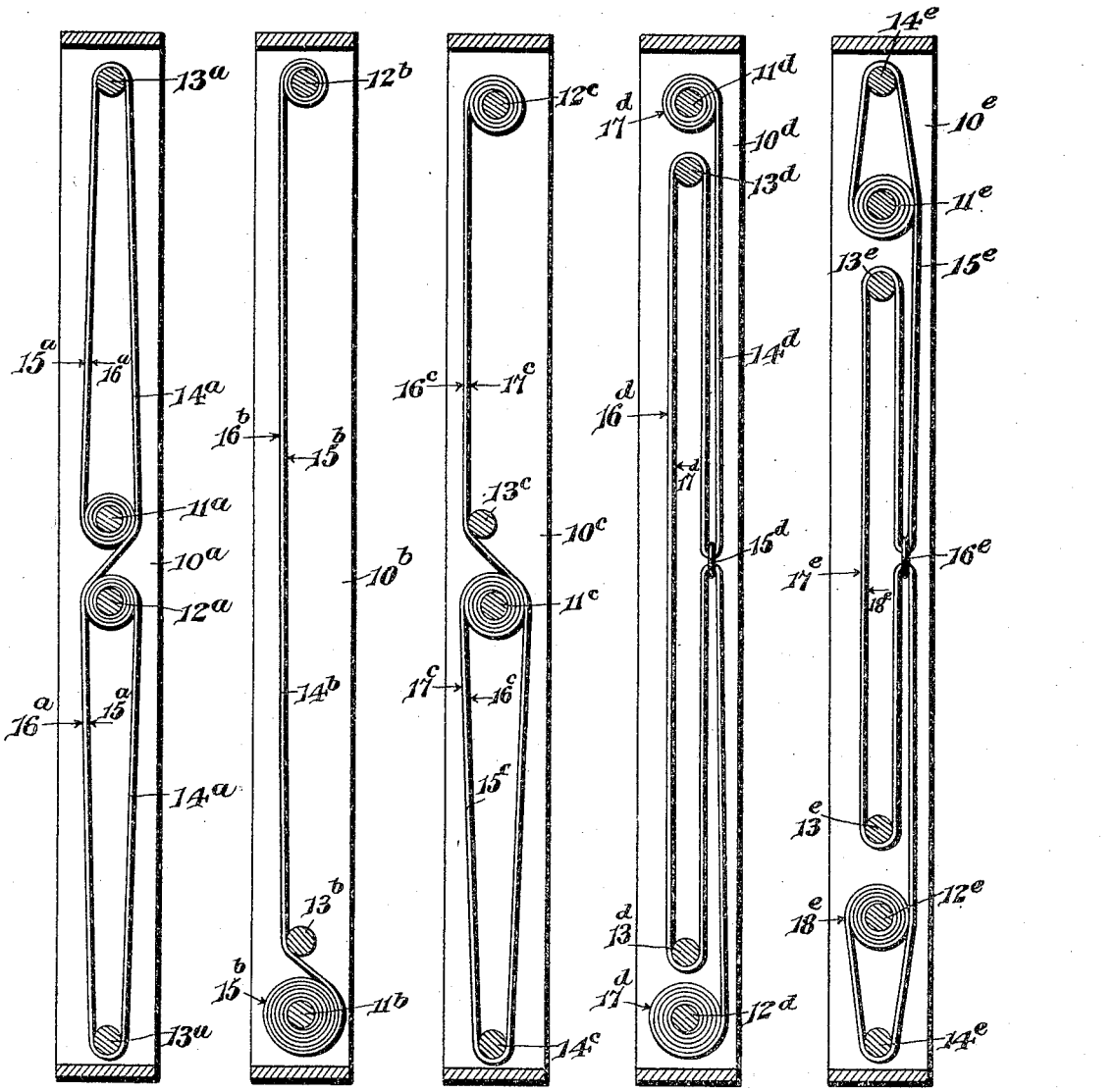

No. 791,943.

Patented June 6, 1905.

UNITED STATES PATENT OFFICE.

JAMES H. PROSSER, OF MAHANOY CITY, PENNSYLVANIA.

EDUCATIONAL APPLIANCE.

SPECIFICATION forming part of Letters Patent No. 791,943, dated June 6, 1905.

Application filed June 22, 1904. Serial No. 213,634.

*To all whom it may concern:*

Be it known that I, JAMES H. PROSSER, a citizen of the United States, residing at Mahanoy City, in the county of Schuylkill and State of Pennsylvania, have invented a new and useful Educational Appliance, of which the following is a specification.

This invention relates to means for teaching objectively by associating the printed name with the pictorial illustration of the same.

In primary work it has been found highly successful in teaching words to associate with the words to be taught pictorial illustrations or symbols of the same, whereupon the words become associated with the pictures in the child's mind, so that when the picture has been removed the names thereof will still be remembered and recognized from their former associations. This is popularly known as the "word method."

The object of the present invention is to provide novel means whereby pictorial illustrations of different objects can be associated with the printed names thereof and a plurality of said names will remain displayed after the illustrations have disappeared, the arrangement being such, however, that upon a simple manipulation of the apparatus the illustrations may be again displayed in conjunction with their names, this action being always assured, so that the apparatus is capable of being properly employed and operated by the child.

In the drawings forming a part of this application, Figure 1 is a plan view of the preferred embodiment of the invention. Fig. 2 is a longitudinal sectional view therethrough. Fig. 3 is a transverse sectional view. Fig. 4 is a detail perspective view of the holding-brake. Fig. 5 is a longitudinal sectional view through a modified form of construction. Fig. 6 is a similar view of another embodiment of the invention. Fig. 7 is a sectional view through a different form of construction. Figs. 8 and 9 are also sectional views through other embodiments of the invention.

Similar reference-numerals indicate corresponding parts in all the figures of the drawings.

In the embodiment illustrated in the first four figures a rectangular and preferably oblong frame 10 is employed, comprising side and end bars inclosing and defining a single unobstructed sight-space, and in the frame contiguous to one end are journaled winding-rollers 11 and 12, each of said rollers having a gudgeon 13 projecting through one side of the frame and provided with a thumb-boss 14. Spring-brakes 15, secured to the frame between and adjacent to the ends of the rollers, have their opposite ends bearing against said rollers and constitute friction-brakes for preventing the too free movement of the same. A guide-roller 16 is journaled in the opposite end of the frame transversely thereof, the axes of said guide and winding rollers being preferably located in substantially the same plane. A belt 17 has one of its terminal portions wound upon the winding-roller 11, said belt thence passing over the other winding-roller about the guide-roller 16 and having its opposite terminal portion wound upon the roller 12. As the belt passes beneath the roller 11 and thence over the roller 12 it will be observed that one face, as 18, is exposed upon the outer side of the roller 11, while the opposite face 19 is exposed between the roller 11 and the roller 16, said roller being employed for the purpose of providing an extended display portion 20 on the belt. Upon the face 19 of the belt 17, which is exposed between the rollers 11 and 16, rows of words are printed or otherwise placed, these words being preferably located in substantial columns and consisting of the names of ordinary well-known objects. On the opposite face, and preferably printed in contrasting colors and in reversed relation, are pictures or symbols illustrating the words. These pictures are also arranged in lines and are disposed so that one line at a time will appear upon the roller 11, as illustrated in Fig. 1. Moreover, the sets of names and pictures are so located that when a row of said pictures is displayed the names of the objects represented will be located directly beneath them. At the same time a plurality of rows of names will be exposed on the extended portion 20 of the belt. Furthermore, the pictures exposed are directly associated with their names, and all the exposed portions of the belt are located in a single sight-space.

It will be apparent that a child by associating the words and pictures will become acquainted with said words through such associations, and consequently will be able to recognize the word after the belt has been turned, so that the picture has disappeared. By having a single line of pictures and a number of lines of names the child may be examined by selecting words at random from those displayed. In case one or more should be forgotten by turning the rollers until the word is located directly beneath the illustration or picture the mind of the child may be refreshed without the necessity of speaking the word. By having the pictures and words arranged on opposite sides of the belt a great many objects may thus be taught, while the belt may be comparatively short. This in connection with the extended display portion of said belt on which the names are placed is an important feature of the invention. In addition to this combination portions of the belt may be employed for representing numbers and groups of the same for the purpose of teaching the principles of arithmetic.

Fig. 5 is a slightly-modified form of construction, the frame being designated $10^a$ and having adjacent winding-rollers $11^a$ and $12^a$. In this instance said winding-rollers are located at the central portion of the frame. A pair of guide-rollers $13^a$ are located, respectively, at the ends of the frame, while the belt $14^a$ has its terminal portions wrapped upon the rollers $11^a$ and $12^a$, thence passing about the rollers $13^a$. This arrangement provides for the exposure of the opposite faces $15^a$ and $16^a$ side by side, and said belt is printed in the manner already described. This arrangement is particularly useful where it is desired to display a series of groups of pictures and a series of names, so that while the two sets are before the child only the lowermost row of animals or objects have the names associated therewith. This arrangement may also be employed where it is desired to have large pictures.

Another very simple embodiment is illustrated in Fig. 6, the frame being designated $10^b$ and the winding-rollers $11^b$ and $12^b$, said rollers being located at the ends of the frame, while the guide-roller $13^b$ is disposed adjacent to one of the winding-rollers. The belt $14^b$ is wound in the same direction upon the rollers $11^b$ and $12^b$ and passed over the roller $13^b$. Thus one face $15^b$ is exposed upon the outer side of the roller $11^b$, while the other face $16^b$ is exposed between the guide-roller $13^b$ and the other winding-roller $12^b$.

Still another form is illustrated in Fig. 7. The frame is shown at $10^c$. One of the winding-rollers $11^c$ is located at the central portion of the frame, while the other roller $12^c$ is located contiguous to the other end thereof.

A guide-roller $13^c$ is journaled adjacent to the roller $11^c$, while another guide-roller $14^c$ is located at the end of the frame opposite that carrying the roller $12^c$. The belt $15^c$ has its terminals wrapped upon the rollers $11^c$ and $12^c$, said belt having intermediate portions passing over the roller $13^c$, about the roller $11^c$, and thence to the roller $14^c$. Thus one face $16^c$ of the belt is exposed in one-half of the frame, while the other face $17^c$ is exposed on the other half, and the same result is accomplished as in the structure illustrated in Fig. 5.

The forms illustrated in Figs. 8 and 9, while quite similar to each other, are somewhat differently arranged from those above described. In Fig. 8 the frame is designated $10^d$, and the winding-rollers $11^d$ and $12^d$ are located at the opposite ends thereof. Guide-rollers $13^d$ are disposed between and adjacent to the rollers $11^d$ and $12^d$. The terminal portions of the belt $14^d$ are wrapped upon the rollers $11^d$ and $12^d$ and have intermediate looped portions secured together, as shown at $15^d$, thence passing about the roller $13^d$ in substantially the form of an endless belt. The face $16^d$, that is exposed between the rollers $13^d$, is the opposite face to that—namely, $17^d$—exposed upon the rollers $11^d$ and $12^d$. In Fig. 9 the frame is designated $10^e$ and the winding-rollers $11^e$ and $12^e$. Not only are intermediate guide-rollers $13^e$ employed, but other guide-rollers $14^e$ are located outside the winding-rollers. The belt $15^e$ has its terminal portions wound upon the rollers $11^e$ and $12^e$, said belt thence passing over the rollers $14^e$, beneath the rollers $11^e$ and $12^e$, and having looped portions secured together, as shown at $16^e$, forming an endless belt passing about the rollers $13^e$. One face $17^e$ is exposed between the rollers $13^e$, while the opposite face $18^e$ is exposed between the winding-rollers and the outermost guide-rollers.

Having thus described my invention, what I claim as new, and desire to secure by Letters Patent, is—

1. In educational apparatus, the combination with a frame having a single open sight-space therein, of winding-rollers journaled on the frame, a guide-roller located in spaced relation to one of the winding-rollers, a belt having its terminal portions wrapped upon the winding-rollers and having its intermediate portions movable over the guide-roller, said belt having portions of its opposite faces simultaneously displayed at one side of the frame in said single sight-space and substantially filling the same, said displayed portions being located directly adjacent to each other, and one of said displayed portions being extended, a column of words located on the side of the belt having the extended portion, a plurality of said words being simultaneously displayed on said exposed portion, and pictorial illustrations of said words located on the opposite side of the belt and successively displayed simultaneously with the words on the other exposed portion of the belt.

2. In educational apparatus, the combination with a frame comprising side and end bars inclosing a single unobstructed sight-space, of transversely-disposed winding-rollers journaled in the frame contiguous to each other, a guide-roller journaled in the frame contiguous to one end of the same, a belt having one terminal portion wound upon one of the winding-rollers, said belt extending over the other winding-roller thence about the guide-roller and having its opposite terminal portion wound upon said other winding-roller, the face of said belt exposed in the extended portion between the first-mentioned winding-roller and the guide-roller being the opposite face to that exposed on said winding-roller all of said exposed portions being located within said single sight-space and directly adjacent to each other, rows of word-symbols located on the face of the belt that is exposed between the winding and guide rollers, a plurality of said rows being simultaneously displayed upon said portion, and rows of pictorial illustrations for the words located on the opposite face of the belt and successively displayed upon the winding-roller, the proper lines of words successively coacting with their lines of illustrations as successively displayed.

In testimony that I claim the foregoing as my own I have hereto affixed my signature in the presence of two witnesses.

JAMES H. PROSSER.

Witnesses:
 JOHN B. REESE,
 G. W. SMITH.